United States Patent [19]

Hayashi

[11] Patent Number: 5,675,200
[45] Date of Patent: Oct. 7, 1997

[54] DYNAMIC PRESSURE AIR BEARING TYPE ELECTRIC MOTOR WITH AIR CIRCULATING ARRANGEMENT

[75] Inventor: Kunio Hayashi, Konan, Japan

[73] Assignee: Kabushiki Kaisha Toshiba, Kawasaki, Japan

[21] Appl. No.: 502,617

[22] Filed: Jul. 14, 1995

[30] Foreign Application Priority Data

Jul. 15, 1994 [JP] Japan .................. 6-163797

[51] Int. Cl.⁶ .................. H02K 5/16; F16C 32/06
[52] U.S. Cl. .................. 310/90; 384/107
[58] Field of Search .................. 310/90; 384/100–124

[56] References Cited

U.S. PATENT DOCUMENTS

| | | | |
|---|---|---|---|
| 4,254,961 | 3/1981 | Fersht et al. | 277/80 |
| 4,470,752 | 9/1984 | Teruo et al. | 415/72 |
| 4,934,836 | 6/1990 | Tanaka et al. | 384/100 |
| 4,938,611 | 7/1990 | Nii et al. | 384/133 |
| 5,018,881 | 5/1991 | Asada | 384/113 |
| 5,089,129 | 2/1992 | Brigman | 210/223 |
| 5,112,141 | 5/1992 | Asada et al. | 384/100 |
| 5,328,272 | 7/1994 | Ainslie et al. | 384/112 |

FOREIGN PATENT DOCUMENTS

| | | |
|---|---|---|
| 63-17322 | 1/1988 | Japan . |
| 5336692 | 12/1993 | Japan . |
| 6311698 | 11/1994 | Japan . |

*Primary Examiner*—Thomas M. Dougherty
*Assistant Examiner*—Jonathan Link
*Attorney, Agent, or Firm*—Cushman Darby & Cushman IP Group of Pillsbury Madison & Sutro, LLP

[57] ABSTRACT

A dynamic pressure air bearing type electric motor includes a motor casing comprising a base having a bearing cylinder and a cover which is attached to the base to cover the bearing cylinder. A rotor assembly is enclosed in the motor casing and has a rotational shaft inserted and held in the bearing cylinder for rotation. The rotational shaft has at least one pair of herringbone grooves formed in the outer circumferential face. A bearing gap is defined between the rotational shaft and the inner circumferential face. A bearing gap is defined between the rotational shaft and the inner circumference of the bearing cylinder. The base has an air flow path formed therein. Upon rotation of the rotor assembly, air is caused to flow through the bearing gap axially along the rotational shaft. An air circulating path is formed in the motor casing so that the air is circulated through the bearing gap, the air flow path in the motor casing, and a gap between a mounting member and the outer circumference of the bearing cylinder.

9 Claims, 8 Drawing Sheets

DYNAMIC PRESSURE AIR BEARING TYPE ELECTRIC MOTOR WITH AIR CIRCULATING ARRANGEMENT

BACKGROUND OF THE INVENTION

1. Field of the Invention

This invention relates to dynamic pressure air bearing type electric motors having a dynamic pressure air bearing.

2. Description of the Prior Art

Dynamic pressure air bearing type electric motors are used for driving polygon mirrors employed for scanning laser beams in laser beam printers, for example. FIG. 8 illustrates such a conventional dynamic pressure air bearing type motor used for driving the polygon mirror. A base 1 of the motor has a plurality of stepped portions on the upper face thereof and a cylindrical portion 2 formed in the central bottom thereof. A bearing cylinder 3 is inserted in the cylindrical portion 2 to be fixed in position by an adhesive agent. A bottom lid 4 is screwed to the bottom of the cylindrical portion 2. A cover 5 is screwed to the upper side of the base 1 so as to cover the bearing cylinder 3. The base 1 and the cover 5 constitute a closed motor casing 6. An electric circuit board 7 is screwed to the upper base 1 in the motor casing 6. A plurality of stator coils 8 are fixed to the upper face of the circuit board 7 by an adhesive agent.

A rotor assembly 10 including a rotational shaft 9 is provided in the motor casing 6. The rotational shaft 9 is rotatably inserted in the bearing cylinder 3 to be held in position. The rotational shaft 9 and the bearing cylinder 3 constitute dynamic pressure air bearing means. Two pairs of herringbone grooves 11, which compose part of the dynamic pressure air bearing means, are formed in the outer circumferential face of the rotational shaft 9.

A flange 12 is fixed to the upper portion of the rotational shaft 9. A rotor yoke 13 is fixed to the flange 12 by an adhesive agent. An annular rotor magnet 14 is fixed to the underside of the rotor yoke 13 by an adhesive agent. The rotor magnet 14 is disposed to be opposite to the stator coils 8 with a predetermined axial gap therebetween. A polygon mirror 15 is mounted to the flange 12. A mounting member 16 is mounted to the back of the flange 12 so as to be rotated with the rotational shaft 9. The mounting member 16 extends through the circuit board 7 so as to cover the bearing cylinder 3 from above the same. A rotating yoke 16a is fixed to the lower portion of the mounting member 16 so as to be positioned under the circuit board 7. An annular, rotor side magnetically levitating magnet 17 is also fixed to the lower portion of the mounting member 16.

The rotating yoke 16a serves as a magnetically focusing yoke, and a magnetically attractive force of the rotor magnet 14 normally acts on the rotating yoke 16a to thereby attract the same. The rotor magnet 14 and the rotating yoke 16a are mounted on the flange 12 and the mounting member 16 respectively which are further mounted to the rotational shaft 9. Accordingly, the distance between the rotor magnet 14 and the rotating yoke 16a is fixed. Consequently, since the magnetically attractive force of the rotor magnet 14 can be offset within the rotor assembly 10, a thrust load can be reduced only to the self-weight of the rotor assembly 10.

An annular, stator side magnetically levitating magnet 18 is fixed to the base 1 so as to surround the magnet 17. The thrust load of the rotor assembly 10 is received by a magnetically repulsive force induced between the magnets 17 and 18.

Upon rotation of the rotor assembly 10, the herringbone grooves 11 draw air into a bearing gap of several μm defined between the inner circumferential face of the bearing cylinder 3 and the outer circumferential face of the rotational shaft 9, whereupon high dynamic pressure serving as a dynamic pressure air bearing is produced. The rotational shaft 9 is rotated without contacting the bearing cylinder 3 by the action of the produced dynamic pressure air bearing. Electric motors employing the dynamic pressure air bearing as described above are suitable for high speed rotation.

The conventional dynamic pressure air bearing type motor has the following problem. The dynamic pressure air bearing type motor is used in a high speed range (10,000 rpm or above, for example) in many cases. Air producing the dynamic pressure is confined in the bearing gap 19 under a high pressure condition. Moisture contained in the air is sometimes condenses under the high pressure condition into dew on the inner circumferential face of the bearing cylinder 3 and the outer circumferential face of the rotational shaft 9 defining the bearing gap 19. The dew condensation prevents normal rotation of the shaft 9 by the dynamic pressure air bearing and rusts the shaft 9.

Furthermore, when a slight amount of dust suspended in the motor casing 6 is carried with air into the narrow bearing gap 19, it remains in the gap, adhering to the inner circumferential face of the bearing cylinder 3 and the outer circumferential face of the shaft 9. The adhered dust also prevents normal rotation of the shaft 9 by the dynamic pressure air bearing. Additionally, the temperature in the bearing section rises since high pressurized air generates heat. The shaft 9 is made of a metal while the bearing cylinder 3 is made from ceramic, for example. Accordingly, the difference in the materials between these members results in a difference in a coefficient of thermal expansion between them. The difference in the coefficient of thermal expansion between the members causes the bearing gap 19 to vary with changes in the temperature. This also prevents the normal rotation of the shaft 9 by the dynamic pressure air bearing. In particular, when the dust collides against a mirror surface of the polygon mirror 15, the mirror surface may be damaged, which reduces the reflectance of the mirror.

SUMMARY OF THE INVENTION

Therefore, an object of the present invention is to provide a dynamic pressure air bearing type electric motor wherein the dew condensation and the adherence of dust can be prevented on and to the inner circumferential face of the bearing cylinder and the outer circumferential face of the rotational shaft defining the bearing gap so that the normal rotation of the shaft by the dynamic pressure air bearing can be ensured.

Another object of the invention is to provide an electric motor for driving the polygon mirror, wherein reduction in the reflectance of the polygon mirror can be prevented and high precision scanning can be performed for a long period of time.

The present invention provides a dynamic pressure air bearing type electric motor comprising a motor casing including a base with a bearing cylinder having two open ends, and a cover attached to the base so that the bearing cylinder is covered and so that the motor casing is closed by the cover, a rotor assembly provided in the motor casing and including a shaft rotatably inserted and held in the bearing cylinder, the shaft having an end, and dynamic pressure air bearing means provided between the shaft and the bearing cylinder. Air-flow generating means is provided for generating a flow of air flowing axially of the shaft in a bearing gap defined between the shaft and the bearing cylinder during rotation of the rotor assembly. An air circulating path is defined in the motor casing so as to circulate air in the motor casing through the air flow path and the bearing gap during rotation of the rotor assembly. A mounting member is mounted on the shaft to cover an outer circumference of the bearing cylinder. An air flow path is defined by the base of the motor casing and an outer circumference of the bearing cylinder to communicate with the bearing gap. An air circulating path is defined in the vicinity of an inner circumference and the outer circumference of the bearing cylinder in the motor casing so as to be substantially closed such that air in the motor casing is circulated therethrough during rotation of the rotor assembly. The air circulating path includes the bearing gap, a gap defined between the mounting member and the outer circumference of the bearing cylinder and the air flow path. A dust filter is provided across the air circulating path.

According to the above-described dynamic pressure air bearing type motor, high-pressurized air in the bearing gap as the result of rotation of the rotor assembly is normally caused to flow through the air circulating path without remaining in the bearing gap. Consequently, the dew condensation can be prevented on the inner circumferential face of the bearing cylinder and the outer circumferential face of the rotational shaft which both define the bearing gap. Furthermore, the dust suspended in the motor casing can be prevented from adhering to the inner circumferential face of the bearing cylinder and the outer circumferential face of the rotational shaft which both define the bearing gap. Additionally, since the air flows through the bearing gap, the temperature rise in the bearing section can be restrained.

Furthermore, a dust filter may be provided across the air circulating path, or two dust filters may be attached to the air inlet and outlet respectively. Since the dust suspended in the motor casing can be caught by the filter or filters, the dust can be more securely prevented from adhering to the inner circumferential face of the bearing cylinder and the outer circumferential face of the rotational shaft which both define the bearing gap. Furthermore, a magnet may be provided at the air flow path for the purpose of further enhancing elimination of the magnetically attracted dust.

The air-flow generating means may be constituted by at least one pair of herringbone grooves which are formed in an outer circumferential face of the rotational shaft and one of which has an axial dimension larger than the other groove. Instead of the axial dimensions, the herringbone grooves may have respective depths differing from each other. Alternatively, the air-flow generating means may be constituted by the herringbone grooves which have air inflow angles differing from each other. Consequently, an air flow can be desirably produced through the bearing gap.

A polygon mirror for scanning laser beams in a laser printer may be provided on the end of the shaft so as to be rotated therewith. The air circulating path is preferably formed so as to avoid an outer periphery of the polygon mirror. Accordingly, dust can be prevented from colliding against the polygon mirror even when the air flowing through the air circulating path contains dust. Consequently, high precision scanning can be performed for a long period of time.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENTS

Figure 1:
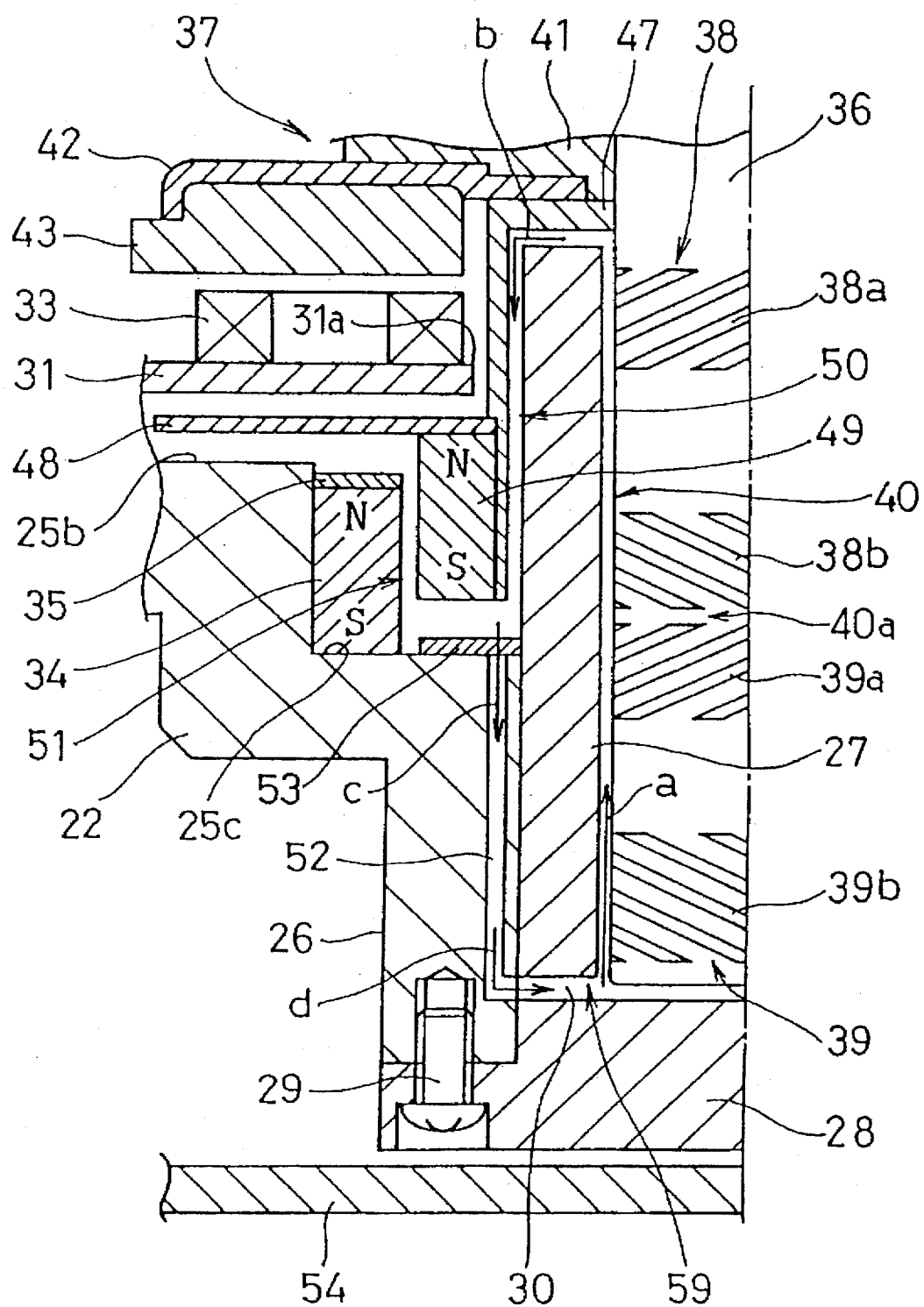
FIG. 1 is an enlarged partial longitudinal section view of a dynamic pressure air bearing type electric motor of a first embodiment in accordance with the present invention.
Figure 2:
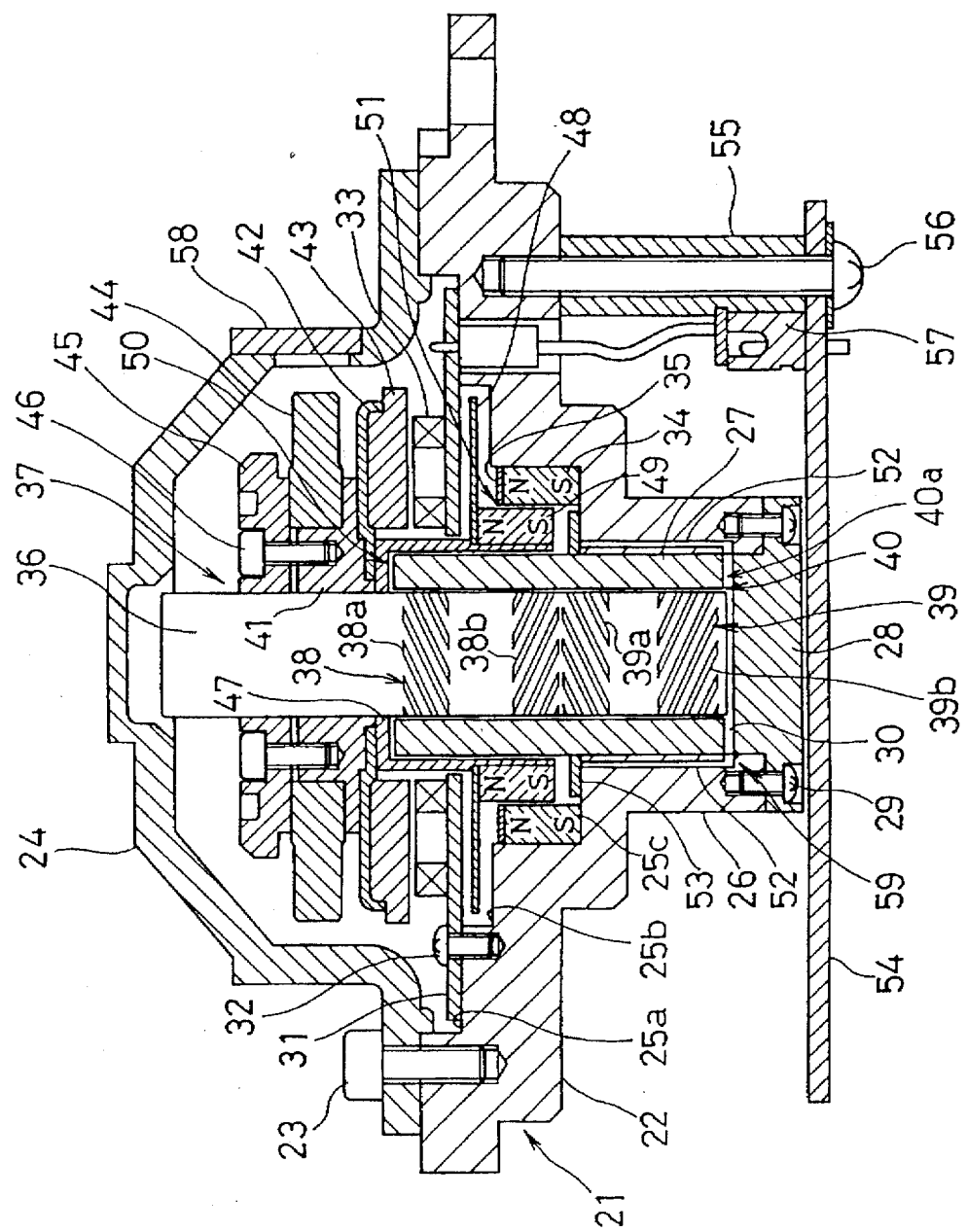
FIG. 2 is a longitudinal section view of the motor.
Figure 3:
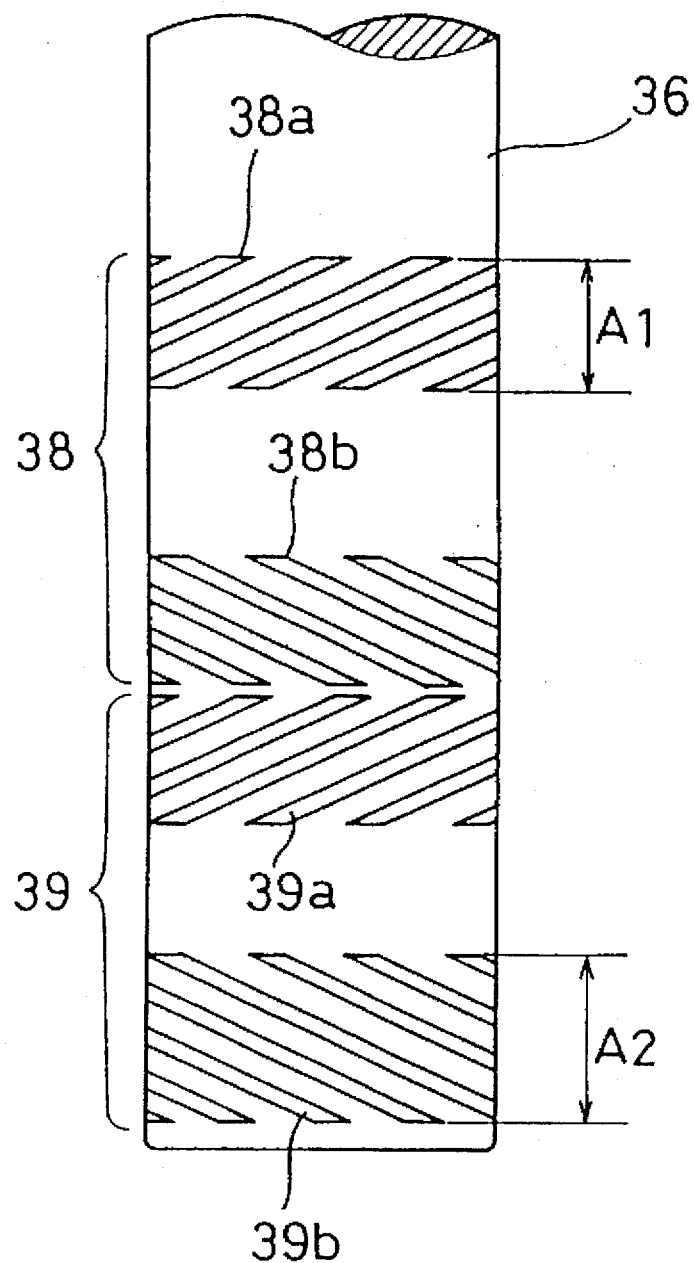
FIG. 3 is an enlarged partial side view of a rotational shaft of the motor.

A first embodiment of the present invention will be described with reference to FIGS. 1 to 3. The dynamic pressure air bearing type electric motor of the invention is applied to a motor for driving a polygon mirror which is employed in a laser beam printer for scanning laser beams. Referring first to FIG. 2, an overall constitution of the motor is shown. A motor casing 21 comprises a base 22 and a cover 24 which is fixed by screws 23 (one of them being shown) to the upper portion of the base 22 to close the same. The base 22 has three stepped portions 25a, 25b and 25c on its upper side and a cylindrical portion 26 formed on the central bottom. A bearing cylinder 27 is inserted in the cylindrical portion 26 to be fixed therein by an adhesive agent. A bottom lid 28 is fixed to the bottom of the cylindrical portion 26 by screws 29 so that a gap 30 is defined between the lower circumferential edge of the bearing cylinder 27 and the upper face of the bottom lid 28, as viewed in FIG. 2.

An electric circuit board 31 is fixed to the upper stepped portion 25a of the base 22 by screws 32. A plurality of stator coils 33 are fixed to the upper face of the circuit board 31 by an adhesive agent. An annular magnet 34 is fixed to the lower stepped portion 25c of the base 22 for the purpose of magnetic levitation at the stator side. An annular yoke 35 is fixed to the top of the magnetically levitating magnet 34. A rotor assembly 37 including a rotational shaft 36 is rotatably mounted in the motor casing 21. The shaft 36 is rotatably inserted in the bearing cylinder 27 and has two pairs 38 and 39 of herringbone grooves formed in an outer circumferential face thereof. The pairs include upper or first grooves 38a and 39a and lower or second grooves 38b and 39b respectively. The direction of inclination of the first grooves 38a and 39a is opposite to that of the second grooves 38b and 39b. The shaft 36 and the bearing cylinder 27 constitute dynamic pressure air bearing means 40a. A bearing gap 40 of about several μm is defined between the inner circumferential face of the bearing cylinder 27 and the outer circumferential face of the rotational shaft 36, as shown in FIG. 1.

An annular flange 41 is mounted to the upper circumferential face of the rotational shaft 36. A rotor yoke 42 is fixed to the underside of the flange 41 by the adhesive agent. An annular rotor magnet 43 is fixed to the underside of the rotor yoke 42 by the adhesive agent. The rotor magnet 43 is disposed relative to the stator coils 33 so that a predetermined axial gap is defined therebetween. A polygon mirror 44 for scanning laser beams in the laser beam printer is attached to the upper portion of the flange 41 by a mirror presser 45 and screws 46 so that the mirror is rotated together with the rotor assembly 37.

A mounting member 47 is mounted to the backside of the flange 41 so as to be rotated with the rotational shaft 36. The mounting member 47 extends through a hole 31a of the circuit board 31 so as to cover the bearing cylinder 27 from above the same, as shown in FIG. 1. A rotating yoke 48 is fixed to a lower portion of the mounting member 47 so as to be positioned under the circuit board 31 in parallel therewith. An annular, rotor side magnetically levitating magnet 49 is also fixed to another lower portion of the mounting member 47. The rotating yoke 48 serves as a magnetically focusing yoke, and a magnetically attractive force of the rotor magnet 43 normally acts on the rotating yoke 48 to thereby attract the same. The rotor magnet 43 and the rotating yoke 48 are mounted on the flange 41 and the mounting member 47 respectively which are further mounted to the rotational shaft 36. Accordingly, the distance between the rotor magnet 43 and the rotating yoke 48 is fixed. Consequently, since the magnetically attractive force of the rotor magnet 43 can be offset within the rotor assembly 37, a thrust load can be reduced only to the self-weight of the rotor assembly 37.

A gap 50 is defined between the upper inner face and the inner circumferential face of the mounting member 47 and the outer circumferential face of the bearing cylinder 27. The rotor side magnetically levitating magnet 49 is inserted in a space between the stator side magnetically levitating magnet 34 and the mounting member 47 with a gap 51 defined between the outer circumferential face of the magnet 49 and the inner circumferential face of the magnet 34. Each of the magnets 34 and 49 is magnetized so as to have the north pole at the upper end and the south pole at the lower end, as viewed in FIG. 2. The thrust load is received by a magnetic repulsive force between the magnets 34 and 49.

The cylindrical portion 26 of the base 22 has two vertically extending first air flow paths 52, for example, as viewed in FIG. 2. Each air flow path 52 is open at the lower stepped portion 25c. Each air flow path 52 is further open at the lower end of the bearing cylinder 27, thereby communicating with the gap 30. A dust filter 53 is disposed at the upper open end of each air flow path 52. The first and second grooves 38a and 38b of the upper pair 38 and the first groove 39a of the pair 39 have the same axial dimension or width A1, as shown in FIG. 3. An axial dimension or width A2 of the second groove 39b of the lower pair 39 is set to be larger than the dimension A1 of the other grooves 38a, 38b and 39a, whereby air is caused to flow through the bearing gap 40 from its lower side toward its upper side during rotation of the rotor assembly 37. Thus, an air-flow generating means is constituted by the herringbone groove pairs 38 and 39 having the above-described dimensional relationship. A circuit board 54 including a drive circuit (not shown) is fixed to the backside of the base 22 by a spacer 55 and a screw 56, as shown in FIG. 2. The electric circuit on the circuit board 54 is electrically connected via an electrical connector 57 to the electric circuit on the circuit board 31 disposed in the motor casing 21. The cover 24 has a window 58 which is disposed so as to correspond to the outer periphery of the polygon mirror 44. Laser beams are allowed to pass through the window 58.

The operation of the motor will now be described. Upon rotation of the rotor assembly 37, the action of the herringbone grooves 38a, 38b, 39a and 39b draws air into the bearing gap 40 between the bearing cylinder 27 and the rotational shaft 36, whereupon high dynamic pressure serving as a dynamic air bearing is produced. The rotational shaft 36 is rotated without contact with the bearing cylinder 27 by the action of the produced dynamic pressure air bearing. Since the axial dimension A2 of the second groove 39b of the pair 39 is larger than the dimension A1 of the other grooves 38a, 38b and 39a, the produced dynamic pressure is higher at the lower side of the bearing gap 40 than at the upper side thereof. Consequently, air flows are produced, forcing the air at the lower side upward. The air is thus caused to flow upwardly from the lower side as shown by arrow a in FIG. 1. After the air flows upward through the bearing gap 40, the air reaches the beginning of the gap 50 defined between the upper end of the shaft 27 and the mounting member 47. Subsequently, the air flows downward through the gap 50 as shown by arrow b in FIG. 1. The air further passes through the dust filter 53, flowing downward through the air flow path 52, as shown by arrow c in FIG. 1. The air then passes through the gap 30 defined between the lower end of the bearing cylinder 27 and the bottom lid 28 as shown by arrow d in FIG. 1, returning to the bearing cylinder 40. Thus, the bearing gap 40, the gap 50, the air flow path 52, and the gap 30 constitute, during rotation of the rotor assembly 37, an air circulating path 59 through which the air in the motor casing 21 is circulated.

According to the above-described embodiment, high-pressurized air in the bearing gap 40 as the result of rotation of the rotor assembly 37 normally flows through the air circulating path 59 without remaining in the bearing gap 40. Consequently, dew condensation can be prevented on the inner circumferential face of the bearing cylinder 27 and the outer circumferential face of the rotational shaft 36 which both define the bearing gap 40. Furthermore, the dust suspended in the motor casing 21 can be prevented from adhering to the inner circumferential face of the bearing cylinder 27 and the outer circumferential face of the rotational shaft 36 both defining the bearing gap 40. Additionally, since the air flows through the bearing gap 40 and around bearing cylinder 27, the temperature rise in the bearing section can be restrained. Consequently, the normal rotation of the motor by the dynamic pressure air bearing can be secured.

Since the dust filter 53 is provided across the air circulating path 59, the dust suspended in the motor casing 21 can be removed. Consequently, the dust can be more reliably prevented from adhering to the inner circumferential face of the bearing cylinder 27 and the outer circumferential face of the rotational shaft 36 which both define the bearing gap 40. Furthermore, since the air circulating path 59 is formed to avoid an outer periphery of the polygon mirror 44, dust can be prevented from colliding against the polygon mirror 44 even when the air flowing through the air circulating path 59 contains the dust. Consequently, a mirror surface of the polygon mirror 44 can be prevented from being damaged and accordingly, a reduction in the reflectance of the mirror can be prevented.

In the foregoing embodiment, the first and second grooves 38a and 38b of the pair 38 and the first groove 39a of the pair 39 have the same axial dimension A1 while the axial dimension A2 of the second groove 39b of the pair 39 is set to be larger than the dimension A1. The axial dimensions of the respective grooves 38a, 38b, 39a and 39b may be gradually reduced in this order so that the lowest groove 39b has the largest axial dimension and the uppermost groove 38a the smallest axial dimension.

Figure 4:
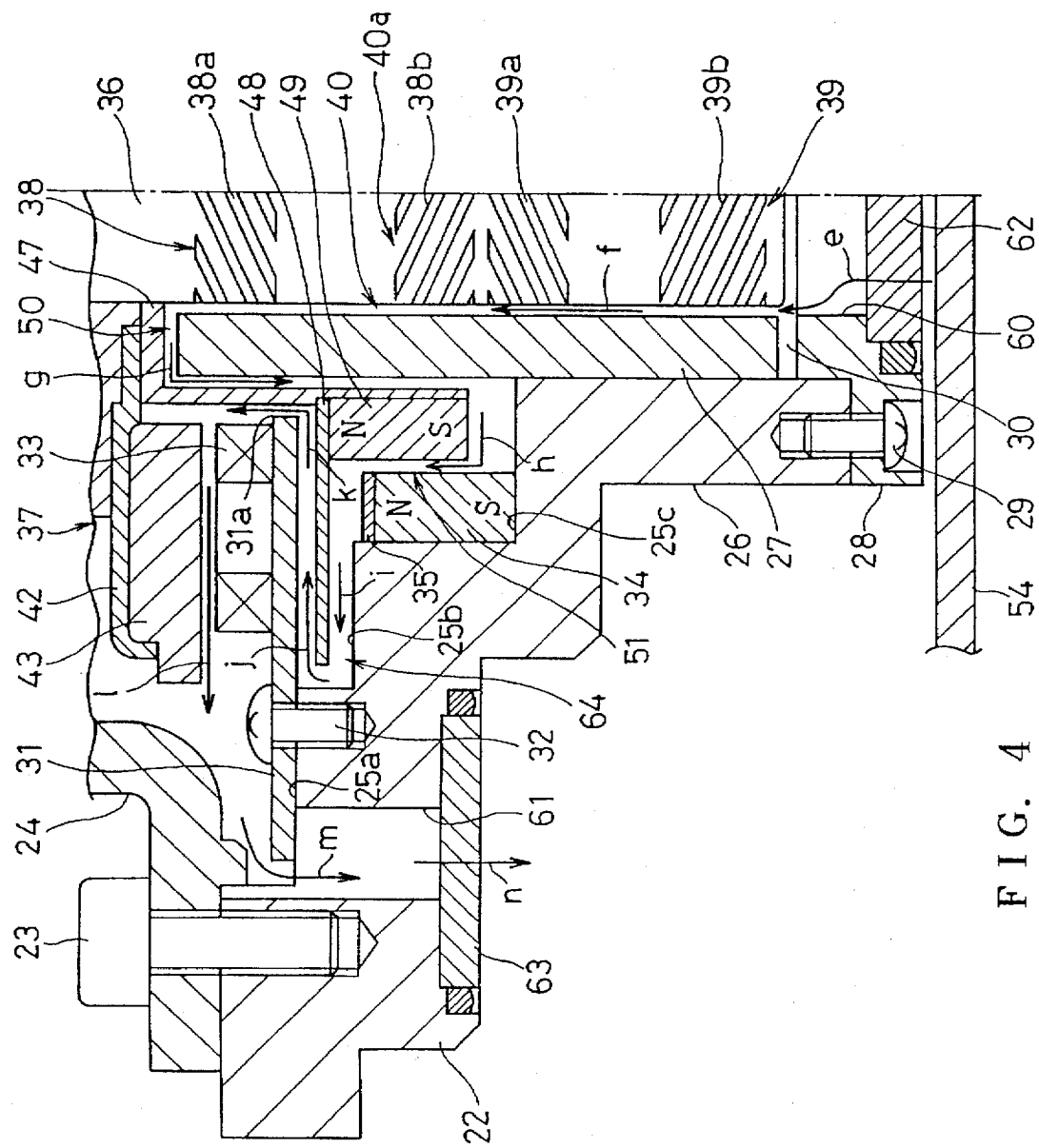
FIG. 4 is a view similar to FIG. 1, showing a dynamic pressure air bearing type electric motor of a second embodiment in accordance with the present invention.
Figure 5:
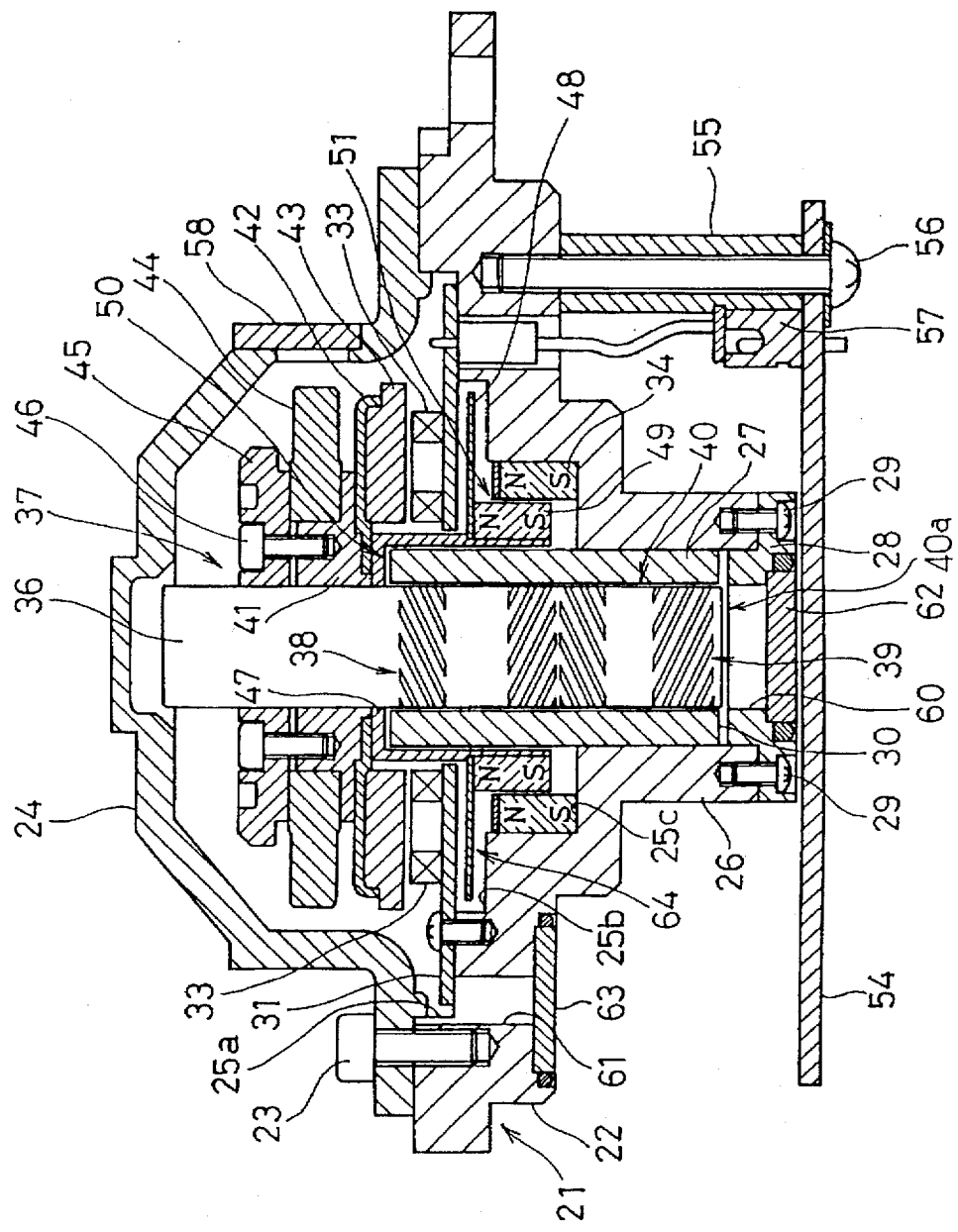
FIG. 5 is a view similar to FIG. 2, showing the motor of the second embodiment.

FIGS. 4 and 5 illustrate a second embodiment of the invention. The identical parts are labeled by the same reference numerals as in the foregoing embodiment. The differences between the first and second embodiments will be described. Referring to FIGS. 4 and 5, the air flow paths 52 formed in the cylindrical portion 26 of the base 22 in the foregoing embodiment are eliminated in the second embodiment. The bottom lid 28 of the base 22 has an air inlet 60 communicating between the bearing gap 40 and the exterior of the motor casing 21, instead. The base 22 further has an air outlet 61 formed in the outer peripheral portion thereof so as to communicate between the interior and exterior of the motor casing 21. Dust filters 62 and 63 are attached to the air inlet 60 and the air outlet 61 respectively.

Upon rotation of the rotor assembly 37, the action of the herringbone grooves 38a, 38b, 39a and 39b draws outside air via the dust filter 62 and the air inlet 60 into the bearing gap 40 between the bearing cylinder 27 and the rotational shaft 36, as shown by arrow e in FIG. 4. Consequently, high dynamic pressure serving as a dynamic air bearing is produced. Thus, the air outside the motor casing 21 is drawn into the bearing gap 40. The air drawn into the bearing gap 40 is caused to flow upward through the bearing gap 40 as shown by arrow f in FIG. 4. After having reached the beginning of the gap 50, the air flows downward through the gap 50 as shown by arrow g in FIG. 4. Flowing through the gap between the stepped portion 25c and the magnet 49, the air flows upward through the gap 51 between the magnets 49 and 34, as shown by arrow h in FIG. 4. The air further flows sequentially through a gap between the stepped portion 25b and the rotating yoke 48, a gap between the rotating yoke 48 and the circuit board 31, and a gap between the circuit board 31 and the mounting member 47 as shown by respective arrows i, j and k. Further flowing through a gap between the stator coils 33 and the rotor magnet 43 as shown by arrow 1, the air reaches the air outlet 61 as shown by arrow m. The air is discharged via the dust filter 63 to the exterior of the motor casing 21 as shown by arrow n. Thus, during rotation of the rotor assembly 37, the outside air is drawn via the air inlet 60 into the bearing gap 40 and another air flow path 64 is constituted in the motor casing 21 to cause the drawn air to flow through the stator coils 33 out of the air outlet 63.

According to the second embodiment, air high-pressurized in the bearing gap 40 as the result of rotation of the rotor assembly 37 is normally caused to flow through the air flow path 64 without remaining in the bearing gap 40. Consequently, the dew condensation can be prevented on the inner circumferential face of the bearing cylinder 27 and the outer circumferential face of the rotational shaft 36 both defining the bearing gap 40. Furthermore, the air flow path 64 communicates with the exterior of the motor casing 21, so that the air flowing through the air flow path 64 is repeatedly replaced by the outside air. Since the bearing section and the stator coils 33 are cooled by the air flowing through the air flow path 64, the temperature rise in the bearing section or the whole motor can be restrained. Consequently, the normal rotation of the motor by the dynamic pressure air bearing can be secured more reliably.

Since the dust filters 62 and 63 are attached to the air inlet 60 and the air outlet 61 of the air flow path 64, extremely small amounts of dust can be removed by these filters. Consequently, the dust can be more reliably prevented from adhering to the inner circumferential face of the bearing cylinder 27 and the outer circumferential face of the rotational shaft 36 which both define the bearing gap 40. Furthermore, the dust can be prevented from being discharged out of the motor casing 21 and flowing into the motor casing 21. Thus, a so-called self-cleaning effect can be achieved. Furthermore, since the air flow path 64 is formed to avoid an outer periphery of the polygon mirror 44, the dust can be prevented from colliding against the polygon mirror 44 even when the air flowing through the air flow path 64 contains dust. Consequently, the mirror surface of the polygon mirror 44 can be prevented from being damaged and accordingly, a reduction in the reflectance of the mirror can be prevented.

Figure 6:
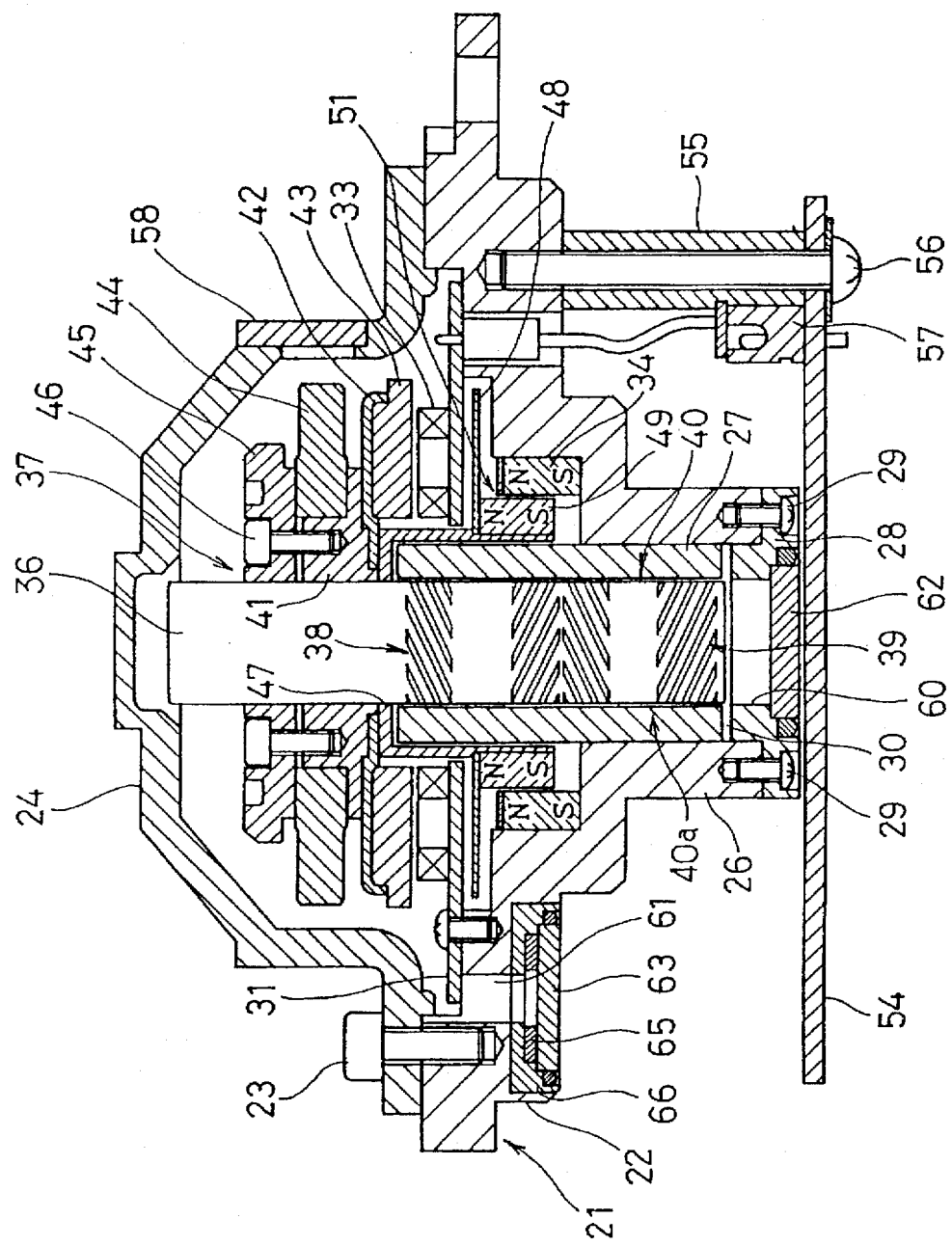
FIG. 6 is a view similar to FIG. 2, showing a dynamic pressure air bearing type electric motor of a third embodiment in accordance with the present invention.

FIG. 6 illustrates a third embodiment of the invention. The difference between the second and third embodiments will be described. The dust filter 63 and an annular magnet 65 are enclosed in a cassette 66 to form a single unit. The cassette 66 enclosing the dust filter 63 and the magnet 65 is detachably attached to the air outlet 61 of the base 22 external to the motor casing 21.

The following advantages can be derived from the third embodiment in addition to the achievement of the effects in the second embodiment. Since the magnet 65 is disposed at the air outlet 61, magnetically attracted dust such as iron powder or magnetic material powder can be removed from the air. Consequently, the dust can be removed more reliably. Furthermore, since the cassette 66 is detachably attached to the air outlet 61 externally of the motor casing 21, attachment and detachment of the dust filter 63 and the magnet 65 can be rendered easy.

Figure 7:
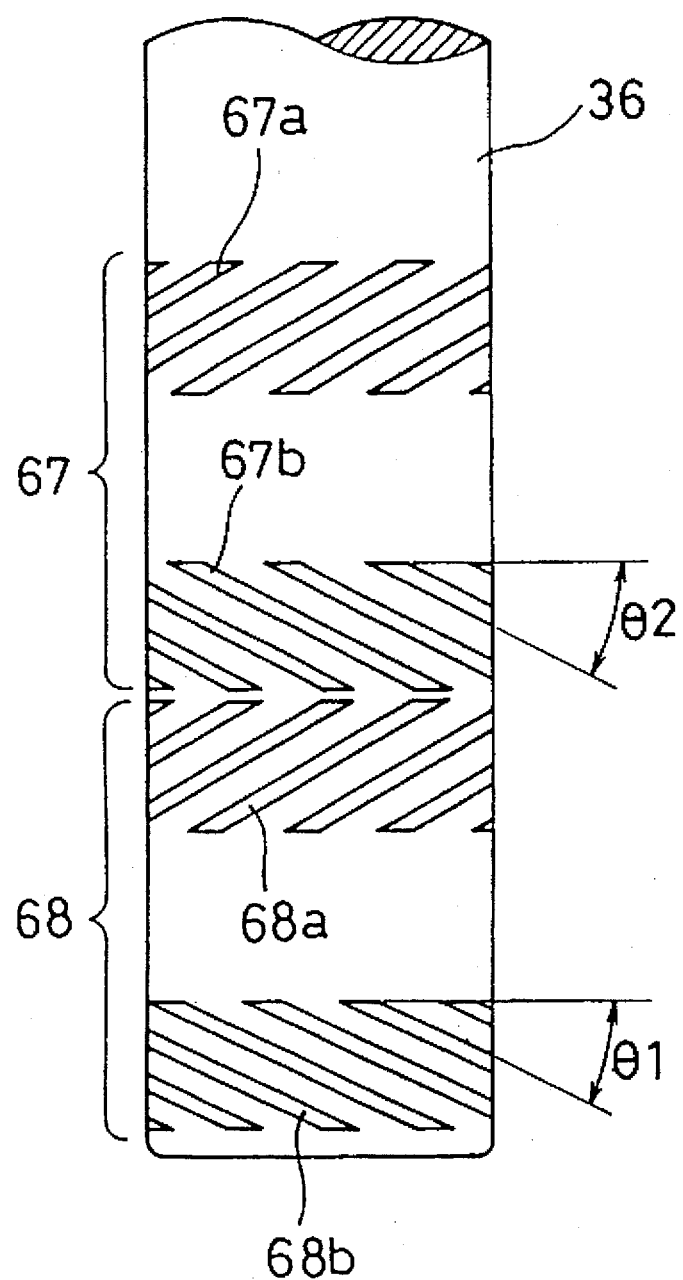
FIG. 7 is a view similar to FIG. 3, showing a rotational shaft employed in a dynamic pressure air bearing type electric motor of a fourth embodiment in accordance with the present invention.
Figure 8:
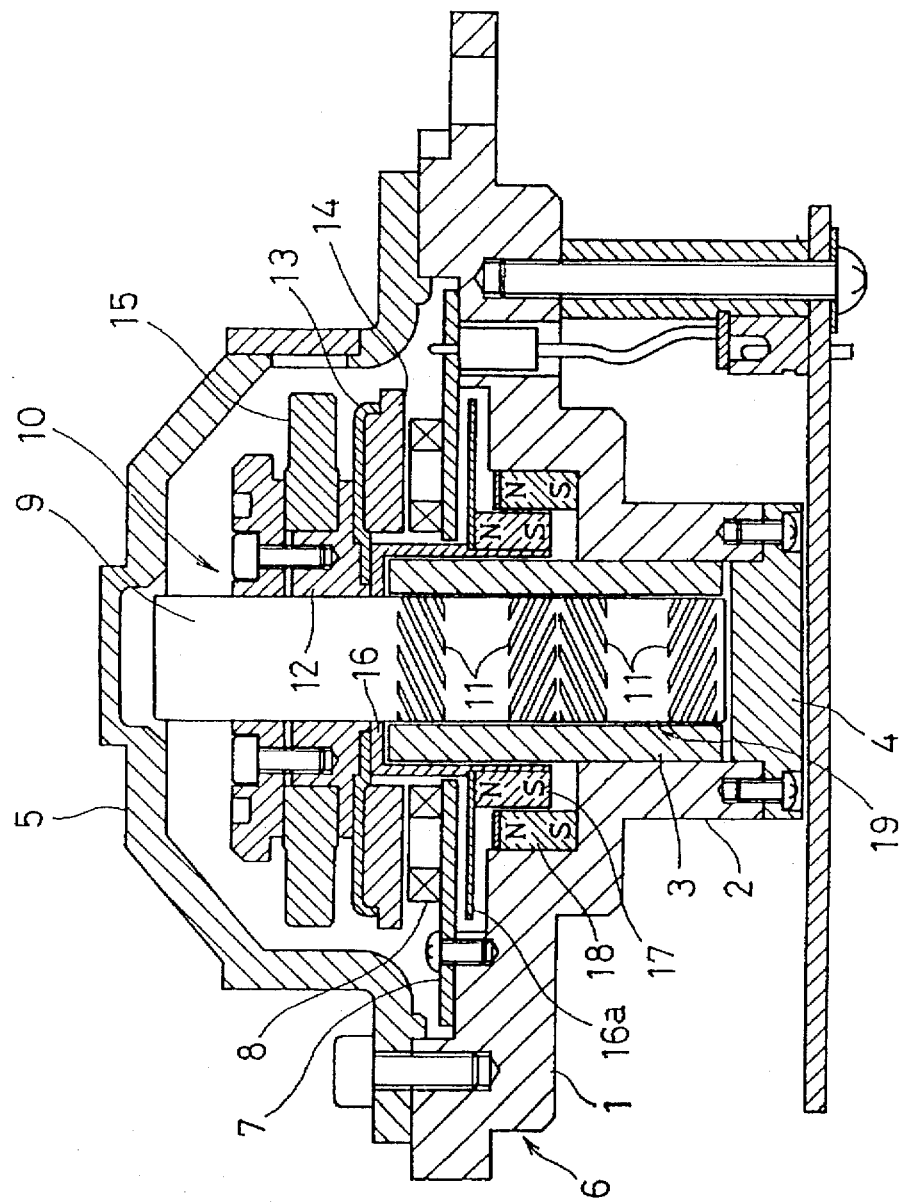
FIG. 8 is a view similar to FIG. 1, showing a prior art.

FIG. 7 illustrates a fourth embodiment of the invention. The fourth embodiment differs from the foregoing embodiments in the arrangement of the air-flow generating means for generating a flow of air flowing through the bearing gap 40 or the arrangement of the herringbone grooves. Referring to FIG. 7, an upper pair 67 includes first and second grooves 67a and 67b and a lower pair 68 first and second grooves 68a and 68b. An air inflow angle θ1 of the second groove 68b of the lower pair 68 is set at 25 degrees, for example. An air inflow angle θ2 of each of the other grooves 67a, 67b and 68a is set to be larger than air inflow angle θ1 of the second groove 68b. Consequently, air is caused to flow through the bearing gap 40 from its lower side toward its upper side (air-flow generating means). In this arrangement, too, the produced dynamic pressure is higher at the lower side of the bearing gap 40 than at the upper side thereof. Consequently, air flows can be produced, forcing the air at the lower side upward.

The air-flow generating means may be constituted by the two pairs 38 and 39 of the herringbone grooves, each of which has depths differing between the air inflow and the air outflow sides thereof. The maximum pneumatic pressure is obtained when the depth of each groove is equal to the width of the bearing gap 40. In order that air is caused to flow upward through the bearing gap 40, the second groove 39b of the lower pair 39 may be set to be equal to the width of the bearing gap 40 and the other grooves 38a, 38b and 39a may be shallower or deeper than the groove 39b. Furthermore, the air-flow generating means may be constituted by the bearing gap which has widths differing between the air inflow and the air outflow sides thereof. A larger pneumatic pressure is obtained as the width of the bearing gap is rendered small. In order that air is caused to flow upwardly through the bearing gap 40, the width of the bearing gap is rendered smaller at the lower side than at the upper side thereof. Additionally, two or more of the above-described arrangements may be combined together for achievement of the air-flow generating means. Furthermore, although two pairs of herringbone grooves are formed in the rotational shaft in the foregoing embodiments, one, three or more pairs may be formed instead.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

I claim:

1. A dynamic pressure air bearing type electric motor comprising:

a motor casing including a base with a bearing cylinder having two open ends, and a cover attached to the base so that the bearing cylinder is covered by the cover and so that the motor casing is closed;

a rotor assembly provided in the motor casing and including a shaft rotatably inserted and held in the bearing cylinder;

dynamic pressure air bearing means provided between the shaft and the bearing cylinder;

air-flow generating means for generating a flow of air flowing axially along the shaft in a bearing gap defined between the shaft and the bearing cylinder during rotation of the rotor assembly;

a mounting member mounted on the shaft to cover an outer circumference of the bearing cylinder;

an air flow path defined by the base of the motor casing and an outer circumference of the bearing cylinder to communicate with the bearing gap; and an air circulating path defined in the vicinity of an inner circumference and the outer circumference of the bearing cylinder in the motor casing such that air in the motor casing is circulated therethrough during rotation of the rotor assembly, the air circulating path including the bearing gap, a gap defined between the mounting member and the outer circumference of the bearing cylinder and the air flow path.

2. A motor according to claim 1, wherein a dust filter is provided across the air circulating path.

3. A motor according to claim 1, wherein a magnet is provided at the air circulating path for collecting magnetically attracted dust.

4. A motor according to claim 1, wherein the dynamic pressure air bearing means has at least one pair of herringbone grooves formed in an outer circumferential face of the shaft, and the air-flow generating means is constituted by the herringbone grooves, one of which has an axial dimension larger than the other groove.

5. A motor according to claim 1, wherein the dynamic pressure air bearing means has at least one pair of herringbone grooves formed in an outer circumferential face of the shaft, and the air-flow generating means comprises by the herringbone grooves having air inflow angles differing from each other.

6. A motor according to claim 1, wherein the dynamic pressure air bearing means has at least one pair of herringbone grooves formed in an outer circumferential face of the shaft, and the air-flow generating means comprises the herringbone grooves which have depths differing from each other.

7. The dynamic pressure air bearing type electric motor of claim 1 wherein the air circulating path is substantially closed.

8. A motor according to any one of claims 1, 3, 4, 5 and 6, wherein a polygon mirror for scanning laser beams in a laser printer is provided on one end of the shaft so as to be rotated therewith.

9. A motor according to any one of claims 1, 3, 4, 5, and 6, wherein a polygon mirror for scanning laser beams in a laser printer is provided on one end of the shaft so as to be rotated therewith, and the air circulating path is formed so as to avoid an outer periphery of the polygon mirror.

* * * * *